United States Patent [19]

Zamora

[11] Patent Number: 4,773,039
[45] Date of Patent: Sep. 20, 1988

[54] INFORMATION PROCESSING SYSTEM FOR COMPACTION AND REPLACEMENT OF PHRASES

[75] Inventor: Elena M. Zamora, Gaithersburg, Md.

[73] Assignee: International Business Machines Corporation, Armonk, N.Y.

[21] Appl. No.: 799,661

[22] Filed: Nov. 19, 1985

[51] Int. Cl.⁴ .............................................. G06F 7/00
[52] U.S. Cl. ................................................. 364/900
[58] Field of Search ... 364/200 MS File, 900 MS File; 400/63

[56] References Cited

U.S. PATENT DOCUMENTS

| | | |
|---|---|---|
| 4,290,105 | 9/1981 | Cichelli et al. ...................... 364/200 |
| 4,456,973 | 6/1984 | Carlgren et al. .................... 364/900 |
| 4,553,860 | 11/1985 | Imaizumi et al. .................. 364/900 |
| 4,633,435 | 12/1986 | Morimoto et al. ................. 364/900 |

*Primary Examiner*—Gareth D. Shaw
*Assistant Examiner*—Debra A. Chun
*Attorney, Agent, or Firm*—Joseph C. Redmond, Jr.; John E. Hoel

[57] ABSTRACT

An information processing system is disclosed which provides a writer with acceptable replacement phrases to substitute for trite phrases in a manuscript text. The replacement phrases are grammatically equivalent to the trite phrases and can be immediately inserted into the text without further alteration.

10 Claims, 12 Drawing Sheets

| | |
|---|---|
| 60 | STORING A PLURALITY OF PHRASE-PAIR EXPRESSIONS IN THE MEMORY, EACH EXPRESSION INCLUDING A SOURCE PHRASE SEGMENT CONTAINING A VARIABLE SOURCE WORD ELEMENT AND A CONSTANT SOURCE WORD ELEMENT AND EACH EXPRESSION INCLUDING A REPLACEMENT PHRASE SEGMENT CONTAINING A VARIABLE REPLACEMENT WORD ELEMENT AND A CONSTANT REPLACEMENT WORD ELEMENT |
| 62 | STORING A SOURCE TABLE IN THE MEMORY, HAVING A PLURALITY OF SOURCE WORD ELEMENT VALUES ARRANGED INTO A PLURALITY OF RANKS HAVING A GRAMMATICALLY SIGNIFICANT SEQUENCE, THE VARIABLE SOURCE WORD ELEMENT IN A FIRST ONE OF THE PLURALITY OF PHRASE-PAIR EXPRESSIONS SERVING AS A POINTER FOR ACCESSING THE SOURCE TABLE |
| 64 | STORING A REPLACEMENT TABLE IN THE MEMORY, HAVING A PLURALITY OF REPLACEMENT WORD ELEMENT VALUES ARRANGED INTO A PLURALITY OF RANKS HAVING A GRAMMATICALLY SIGNIFICANT SEQUENCE WITH VALUES IN EACH RANK OF THE REPLACEMENT TABLE BEING GRAMMATICALLY EQUIVALENT TO THE VALUES IN A CORRESPONDING RANK OF THE SOURCE TABLE, THE VARIABLE REPLACEMENT WORD ELEMENT IN THE FIRST ONE OF THE PHRASE-PAIR EXPRESSIONS SERVING AS A POINTER FOR ACCESSING THE REPLACEMENT TABLE |
| 66 | COMPARING IN THE EXECUTION UNIT, FIRST TARGET WORDS FROM THE INPUT WORD STREAM WITH THE CONSTANT SOURCE WORD ELEMENTS IN THE PLURALITY OF PHRASE-PAIR EXPRESSIONS |
| 68 | ACCESSING THE FIRST ONE OF THE PHRASE-PAIR EXPRESSIONS HAVING A CONSTANT SOURCE WORD ELEMENT EQUAL TO A SELECTED ONE OF THE FIRST TARGET WORDS |
| 70 | ACCESSING THE SOURCE TABLE WHICH IS POINTED TO BY THE VARIABLE SOURCE WORD ELEMENT IN THE FIRST ONE OF THE PHRASE-PAIR EXPRESSIONS |
| 72 | COMPARING EACH OF THE SOURCE WORD ELEMENT VALUES IN THE SOURCE TABLE WITH A SECOND TARGET WORD FROM THE INPUT WORD STREAM PROXIMATE TO THE SELECTED ONE OF THE FIRST TARGET WORDS |
| 74 | IDENTIFYING THE GRAMMATICALLY SIGNIFICANT RANK OF THE SOURCE WORD ELEMENT VALUE IN THE SOURCE TABLE WHICH IS EQUAL TO THE SECOND TARGET WORD |
| 76 | ACCESSING THE REPLACEMENT TABLE WHICH IS POINTED TO BY THE VARIABLE REPLACEMENT WORD ELEMENT IN THE FIRST ONE OF THE PHRASE-PAIR EXPRESSIONS |
| 78 | ACCESSING FROM THE REPLACEMENT TABLE THE GRAMMATICALLY EQUIVALENT REPLACEMENT WORD ELEMENT VALUE IN THE RANK OF THE REPLACEMENT TABLE WHICH CORRESPONDS TO THE GRAMMATICALLY SIGNIFICANT RANK IDENTIFIED IN THE SOURCE TABLE |
| 80 | OUTPUTTING AN OUTPUT REPLACEMENT PHRASE TO THE OUTPUT UNIT, WHICH INCLUDES THE GRAMMATICALLY EQUIVALENT REPLACEMENT WORD ELEMENT VALUE AND THE CONSTANT REPLACEMENT WORD ELEMENT FROM THE FIRST ONE OF THE PHRASE-PAIR EXPRESSIONS |

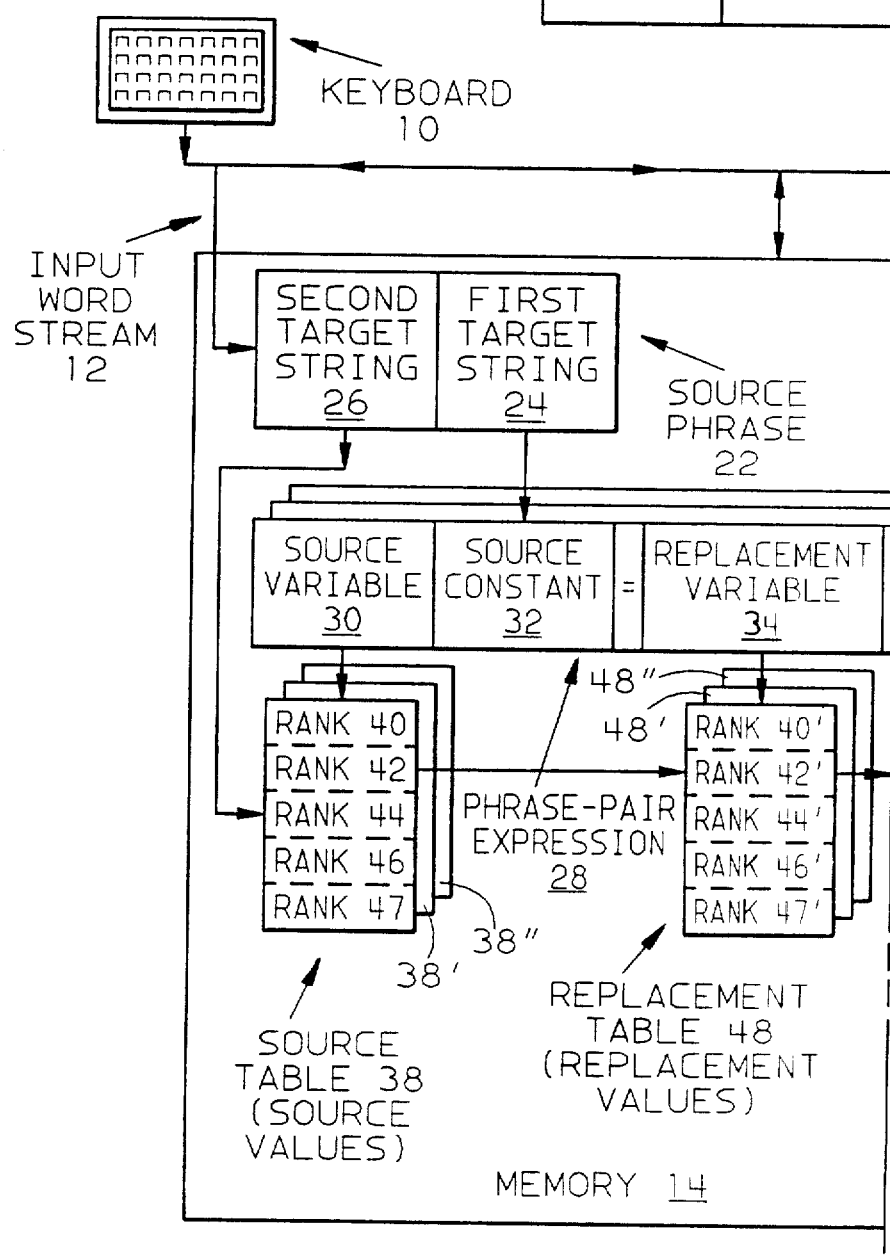

| | |
|---|---|
| 60 | STORING A PLURALITY OF PHRASE-PAIR EXPRESSIONS IN THE MEMORY, EACH EXPRESSION INCLUDING A SOURCE PHRASE SEGMENT CONTAINING A VARIABLE SOURCE WORD ELEMENT AND A CONSTANT SOURCE WORD ELEMENT AND EACH EXPRESSION INCLUDING A REPLACEMENT PHRASE SEGMENT CONTAINING A VARIABLE REPLACEMENT WORD ELEMENT AND A CONSTANT REPLACEMENT WORD ELEMENT |
| 62 | STORING A SOURCE TABLE IN THE MEMORY, HAVING A PLURALITY OF SOURCE WORD ELEMENT VALUES ARRANGED INTO A PLURALITY OF RANKS HAVING A GRAMMATICALLY SIGNIFICANT SEQUENCE, THE VARIABLE SOURCE WORD ELEMENT IN A FIRST ONE OF THE PLURALITY OF PHRASE-PAIR EXPRESSIONS SERVING AS A POINTER FOR ACCESSING THE SOURCE TABLE |
| 64 | STORING A REPLACEMENT TABLE IN THE MEMORY, HAVING A PLURALITY OF REPLACEMENT WORD ELEMENT VALUES ARRANGED INTO A PLURALITY OF RANKS HAVING A GRAMMATICALLY SIGNIFICANT SEQUENCE WITH VALUES IN EACH RANK OF THE REPLACEMENT TABLE BEING GRAMMATICALLY EQUIVALENT TO THE VALUES IN A CORRESPONDING RANK OF THE SOURCE TABLE, THE VARIABLE REPLACEMENT WORD ELEMENT IN THE FIRST ONE OF THE PHRASE-PAIR EXPRESSIONS SERVING AS A POINTER FOR ACCESSING THE REPLACEMENT TABLE |
| 66 | COMPARING IN THE EXECUTION UNIT, FIRST TARGET WORDS FROM THE INPUT WORD STREAM WITH THE CONSTANT SOURCE WORD ELEMENTS IN THE PLURALITY OF PHRASE-PAIR EXPRESSIONS |
| 68 | ACCESSING THE FIRST ONE OF THE PHRASE-PAIR EXPRESSIONS HAVING A CONSTANT SOURCE WORD ELEMENT EQUAL TO A SELECTED ONE OF THE FIRST TARGET WORDS |
| 70 | ACCESSING THE SOURCE TABLE WHICH IS POINTED TO BY THE VARIABLE SOURCE WORD ELEMENT IN THE FIRST ONE OF THE PHRASE-PAIR EXPRESSIONS |
| 72 | COMPARING EACH OF THE SOURCE WORD ELEMENT VALUES IN THE SOURCE TABLE WITH A SECOND TARGET WORD FROM THE INPUT WORD STREAM PROXIMATE TO THE SELECTED ONE OF THE FIRST TARGET WORDS |
| 74 | IDENTIFYING THE GRAMMATICALLY SIGNIFICANT RANK OF THE SOURCE WORD ELEMENT VALUE IN THE SOURCE TABLE WHICH IS EQUAL TO THE SECOND TARGET WORD |
| 76 | ACCESSING THE REPLACEMENT TABLE WHICH IS POINTED TO BY THE VARIABLE REPLACEMENT WORD ELEMENT IN THE FIRST ONE OF THE PHRASE-PAIR EXPRESSIONS |
| 78 | ACCESSING FROM THE REPLACEMENT TABLE THE GRAMMATICALLY EQUIVALENT REPLACEMENT WORD ELEMENT VALUE IN THE RANK OF THE REPLACEMENT TABLE WHICH CORRESPONDS TO THE GRAMMATICALLY SIGNIFICANT RANK IDENTIFIED IN THE SOURCE TABLE |
| 80 | OUTPUTTING AN OUTPUT REPLACEMENT PHRASE TO THE OUTPUT UNIT, WHICH INCLUDES THE GRAMMATICALLY EQUIVALENT REPLACEMENT WORD ELEMENT VALUE AND THE CONSTANT REPLACEMENT WORD ELEMENT FROM THE FIRST ONE OF THE PHRASE-PAIR EXPRESSIONS |

FIG. 3

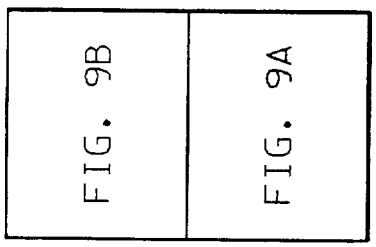
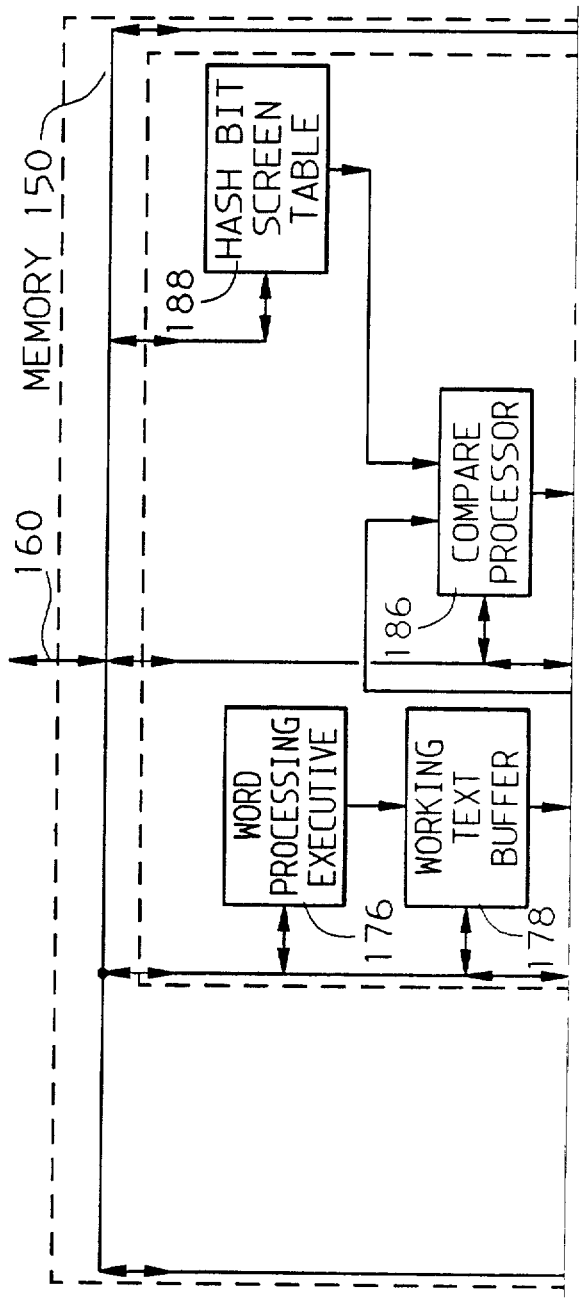

INFORMATION PROCESSING SYSTEM FOR COMPACTION AND REPLACEMENT OF PHRASES

BACKGROUND OF THE INVENTION

1. Technical Field

The invention disclosed broadly relates to information processing systems and more particularly relates to improvements to word processing systems.

2. Background Art

The test of effective writing is whether the reader is left with an accurate understanding of the writer's intended meaning. Each word or phrase should contribute to the accurate flow of information from the writer to the reader. However, even practiced writers commit the error occasionally using tired, over-familiar words and phrases which have been used by many other writers and which have come in time to mean little. An example is using the phrase "wearing two hats" to convey the meaning of having two jobs or capacities. Another example is substituting the phrase "in no uncertain terms" for the single word "clearly." These errant usages are variously referred to as cliches, trite metaphors, set phrases, pseudo-jargon, popularized technicalities or vogue words. They all have the common fault of not saying what the writer means but only approximating his thought at best, and possibly giving the reader an unintended message that the writer is a lazy thinker.

It would be useful to provide a mechanism for automatically scanning the text of a manuscript on command, searching for trite phrases, highlighting the offending passage and suggesting to the writer acceptable alternatives which can be substituted into the text. A medium which suggests itself for this mechanism is the modern word processor and its associated dictionary-based features. Existing word processors include the dictionary-based feature of checking for spelling errors on command by scanning the text of a manuscript stored in a storage medium, comparing each word in the text with a stored dictionary of correctly spelled words, highlighting misspelled words in the text, and suggesting to the writer the correctly spelled form of the word. One example of this spell-checking feature in a word processor is described in U.S. Pat. No. 4,136,395 to Kolpek, et al., entitled "System for Automatically Proofreading a Document," assigned to IBM Corporation. Another dictionary-based feature found in existing word processors is the display of a list of synonyms on command. This is done by scanning the text of a manuscript stored in a storage medium, comparing a word selected by the writer from the text with a stored dictionary of synonyms, and suggesting to the writer acceptable synonyms for the selected word. One example of this synonym generation feature in a word processor is described in U.S. Pat. No. 4,384,329 to Rosenbaum, et al., entitled "Retrieval of Related Linked Linguistic Expressions Including Synonyms and Antonyms," assigned to IBM Corporation.

However, the problem of automatically displaying suggested acceptable phrases to replace trite phrases in a manuscript text cannot be solved with the principles used in existing dictionary-based word processing features, because of the need to make the replacement phrase grammatically equivalent to the trite phrase which is to be replaced. Pronouns in the replacement phrase must grammatically agree in person, gender and number with their antecedents in the original sentence. Verbs in the replacement phrase must grammatically agree in person and number with the subject of the original sentence. Grammatic agreement means to correspond in form. For example, if the subject in the original sentence is third person, plural, then the verb in the replacement phrase for that sentence must also be third person, plural.

For a specific example, the sentence "I am not about to climb that mountain." contains the trite phrase "am not about to." A more accurate expression of the writer's meaning is stated by substituting the replacement phrase "do not intend to" for the trite phrase. However, if the original sentence were "He is not about to climb that mountain.", then in order to be grammatically equivalent, the sentence with the replacement phrase would have to start "He does not intend to . . . " The change in the person of the pronoun from the first person form "I" to the third person form "He" requires changing the verb in the trite phrase from "am" to "is" and requires changing the verb in the replacement phrase from "do" to "does." To be grammatically correct, a verb in a sentence must agree with the person of its subject.

If the example is carried one step further, the number of the subject can be changed from singular to plural. Thus, if the third person singular pronoun in the sentence "He is not about to climb that mountain." is changed to the third person plural "They," the verb "is" in the trite sentence is changed to "are," as in "They are not about to climb that mountain." The sentence with the grammatically equivalent replacement phrase would then start "They do not intend to . . . " Thus, to be grammatically correct, a verb in a sentence must agree with the number as well as the person of its subject.

The problem of maintaining grammatical equivalence between the replacement phrase and the trite phrase it replaces becomes further complicated by the requirement that the tense of the verb in the replacement phrase must be the same as the tense of the verb in the trite phrase. If the example is carried an additional step, the tense of the verb can be changed from present to past tense. Thus, if the third person, plural, present tense verb "are" in the trite sentence "They are not about to climb that mountain." is changed to the past tense verb "were," then the third person, plural, present tense verb "do" must be changed to the past tense "did" for the sentence with the replacement phrase "They did not intend to . . . " Thus, to be grammatically correct, a verb in the replacement phrase must agree with the tense, as well as the number and person of the verb in the trite phrase being replaced. This characterizes some of the problems facing prior art.

OBJECTS OF THE INVENTION

It is therefore an object of the invention to provide an improved mechanism for substituting grammatically equivalent replacement phrases for source phrases in a text.

It is a further object of the invention to store source phrases and corresponding replacement phrases in a computer memory, in a more compact manner than has been available in the prior art.

SUMMARY OF THE INVENTION

These and other objects, features and advantages are accomplished by the information processing system invention disclosed herein. The invention provides a writer with acceptable replacement phrases to substitute for trite phrases in a manuscript text. The replacement phrases are grammatically equivalent to the trite phrases to be replaced and can be immediately inserted into the text without further alteration.

Each trite phrase for which a replacement is desired, is paired with its corresponding replacement phrase. A family of trite phrases and its corresponding family of replacement phrases are represented by a phrase-pair expression which symbolizes the phrases in all of their parts of speech (number, gender, tense, etc.). Each phrase-pair expression includes a source phrase segment representing the family of trite phrases, which contains a variable source word element and a constant source word element. Each phrase-pair expression also includes a replacement phrase segment containing a variable replacement word element and a constant replacement word element. A plurality of these phrase-pair expressions are stored in the memory of a word processing computer, each expression representing a different family of paired trite and replacement phrases.

The variable source word element in a phrase-pair expression, symbolically represents all of the parts of speech for a verb (for example) in the trite phrase. The variable source word element serves as an address pointer to a first table called the source table stored in the memory, containing all of the forms of the symbolically represented verb. These verb forms are called values of the variable source word element. The plurality of source verb forms are arranged into a plurality of ranks in the source table, having a grammatically significant sequence. A plurality of source tables is stored in the memory, each table corresponding to a different family of verb forms, pronoun forms, and other parts of speech.

The variable replacement word element in a phrase-pair expression symbolically represents all of the parts of speech for a corresponding replacement verb (continuing the example) in the replacement phrase. The variable replacement word element serves as an address pointer to a second table called the replacement table stored in the memory, containing all of the forms of the symbolically represented replacement verb. These verb forms are called values of the variable replacement word element. The plurality of replacement verb forms are arranged into a plurality of ranks having a grammatically significant sequence with the verb form in each rank of the replacement table being grammatically equivalent to the verb form in a corresponding rank of the source table. A plurality of replacement tables is stored in the memory, each table corresponding to a different family of verb forms, pronoun forms, and other parts of speech.

The writer at the keyboard of a word processing computer drafting his manuscript text, enters strings of alpha-numeric characters which comprise an input word stream. That input word stream can be stored in the memory of the computer or on the disk storage of the computer for further editing operations. Whether the manuscript text is read from the memory, from the disk storage or directly from the keyboard, the resultant strings of alpha-numeric characters can be considered the input word stream which is operated on by the invention.

In response to a command entered by the writer, the execution unit of the computer will compare first target words from the input word stream with the constant source word elements in each of the plurality of phrase-pair expressions. The constant source word element in a phrase-pair expression is the constant portion of the trite phrase which does not change when the phrase is used in various parts of speech. This constant portion can be a single word or a sequence of words in an alpha-numeric string which is compared with the alpha-numeric strings in the input word stream. Each phrase-pair expression in the memory is accessed for the comparison and eventually a match is found between the constant portion of a trite phrase in one of the phrase-pair expressions and a target word or sequence of words in the input word stream.

The variable source word element in the trite phrase portion of the matched phrase-pair expression is then used as an address pointer to the source table containing all of the forms of the symbolically represented verb in the trite phrase. This source table is accessed and each of the verb forms in the table are compared with a second target word in the input word stream which is proximate to the first target words found to match the constant portion of the trite phrase. If a match is found with one of the verb forms in the source table, then an actual trite phrase has been located in the input word stream. The matched words will be highlighted on the display screen of the computer as a trite phrase which is a candidate for replacement.

The invention then proceeds to generate the grammatically equivalent replacement phrase by identifying the grammatically significant rank of the trite verb form in the source table which is equal to the matched, second target word.

Then the replacement table is accessed. This is accomplished by using the variable replacement word element in the replacement phrase portion of the matched phrase-pair expression as an address pointer to the replacement table containing all of the forms of the symbolically represented verb in the replacement phrase. This replacement table is accessed and the replacement verb form in the rank of the table which corresponds to the grammatically significant rank previously identified in the source table, is selected as the replacement verb for the replacement phrase.

An output replacement phrase is then constructed from the replacement verb selected from the replacement table and the constant replacement word element in the matched phrase-pair expression. The constant replacement word element in the phrase-pair expression is the constant portion of the replacement phrase which does not change when the phrase is used in various parts of speech. This constant portion can be a single word or a sequence of words in an alpha-numeric string, to which is added the replacement verb to form the output replacement phrase.

The output replacement phrase is then displayed on the display screen to the writer. The writer can then decide whether he wants to substitute the replacement phrase for the highlighted trite phrase. If he desires to make the substitution, the writer enters a command at the keyboard and the alpha-numeric string comprising the replacement phrase is substituted for the first and second target words in the input word stream.

In this manner, replacement phrases which are grammatically equivalent to the trite phrases to be replaced, can be immediately inserted into the text without further alteration. The invention also provides a significant compaction of the trite phrases and the replacement phrases for storage in the memory.

BRIEF DESCRIPTION OF THE FIGURES

These and other objects, features and advantages of the invention will be more fully appreciated with reference to the accompanying figures.

FIG. 3 is a flow diagram of the sequence of operational steps carried out by the first embodiment of the invention.

DESCRIPTION OF THE PREFERRED EMBODIMENTS

Figure 1B:
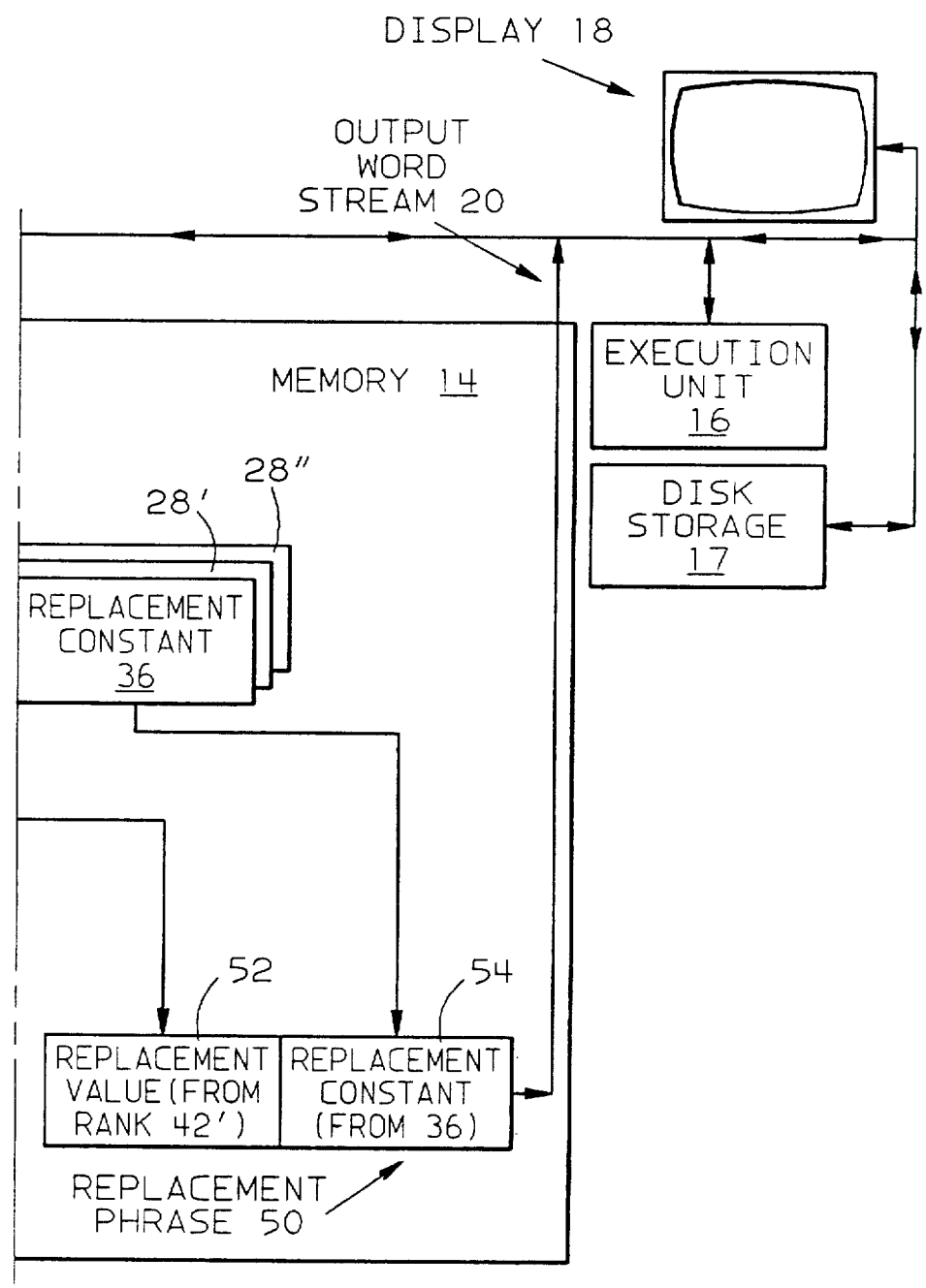
FIG. 1 is a system block diagram of the first embodiment of the invention.
Figure 2:
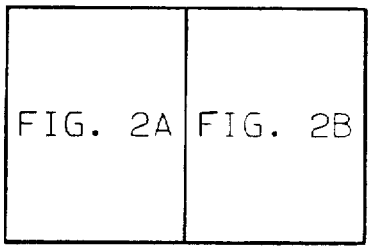
FIG. 2 shows the system block diagram of FIG. 1, during the operation of the invention on an input word stream.
Figure 2A:
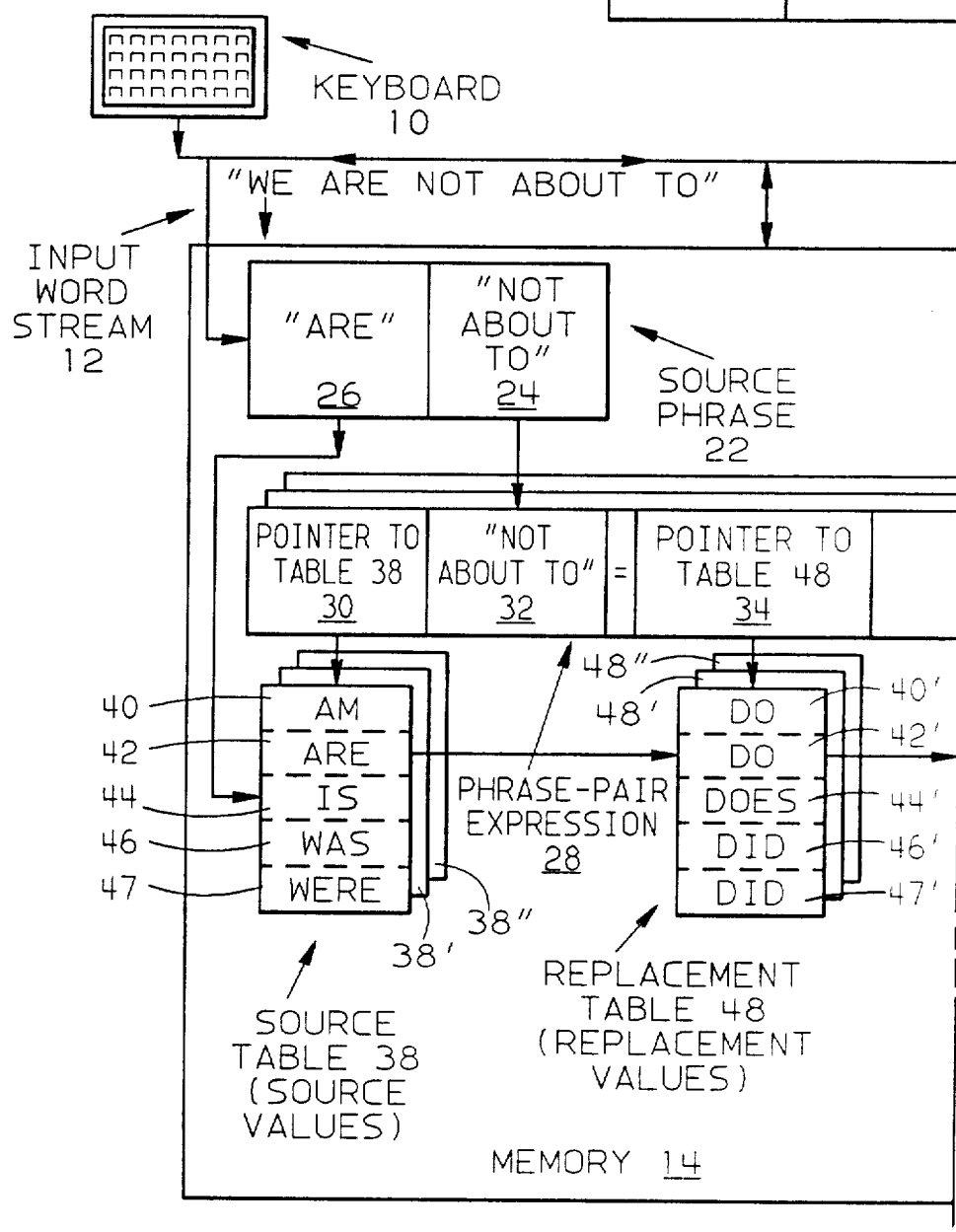
Figure 2B:
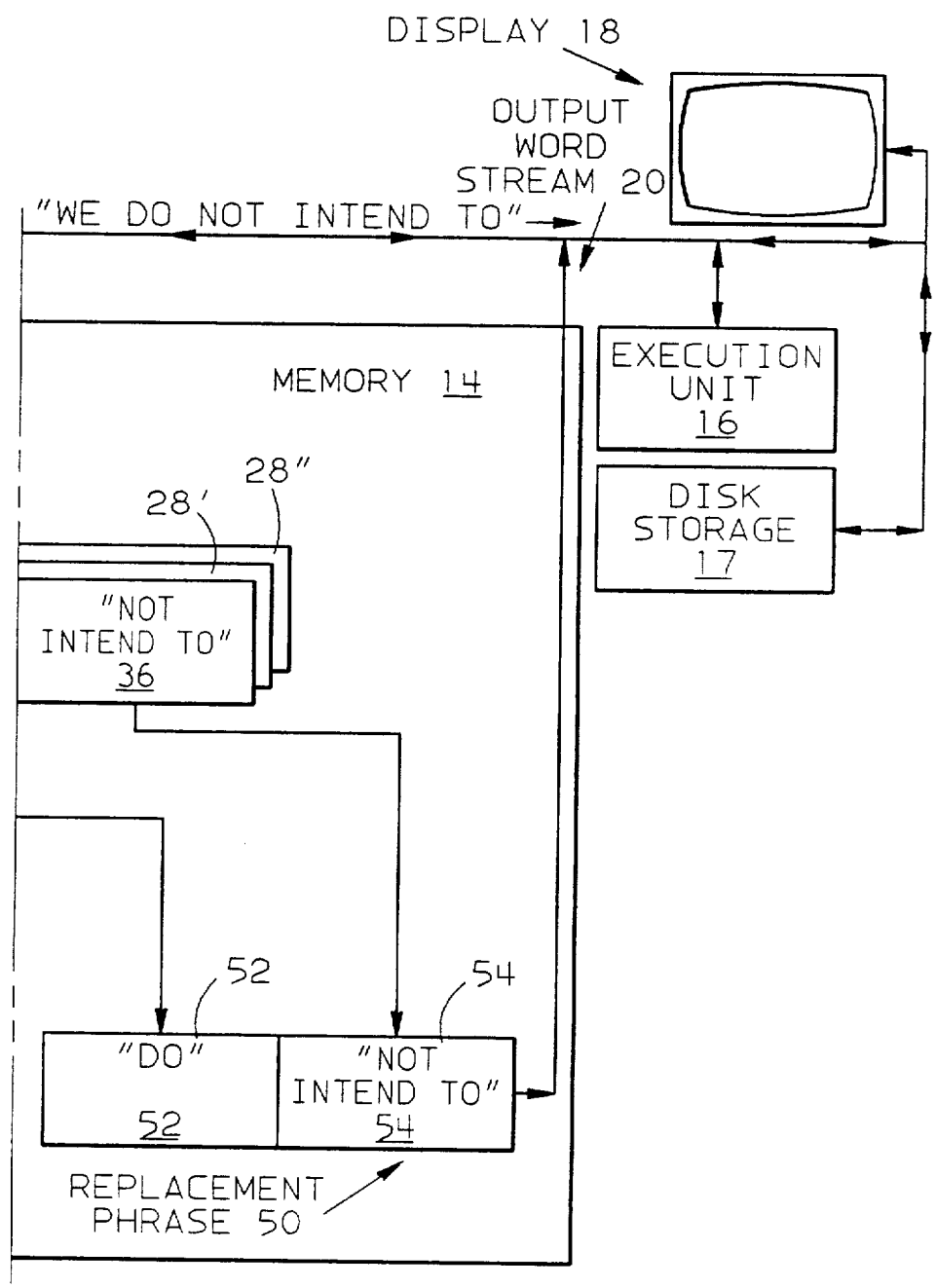

The first embodiment of the invention, shown in FIGS. 1, 2 and 3, is a simplified version of the second embodiment of the invention shown in FIGS. 4–9. The second embodiment of the invention makes use of the principles of operation described for the first embodiment of the invention, and adds to those principles some additional refinements which will be discussed later in this disclosure.

The information processing system shown in FIG. 1 provides a writer with acceptable replacement phrases to substitute for trite phrases in a manuscript text. In accordance with the invention, the replacement phrases which are produced are grammatically equivalent to the trite phrases to be replaced and can be immediately inserted into the text without further alteration. The system shown in FIG. 1 is a word processing computer wherein an input word stream 12 of natural language text is input at the keyboard 10 by the writer in the process of drafting his manuscript text. The writer enters strings of alpha-numeric characters at the keyboard 10, which comprise the input word stream 12. The input word stream 12 can be stored in the memory 14 or in the disk storage 17 of the computer for further editing operations. Whether the manuscript text is read from the memory 14, the disk storage 17 or whether it is directly input at the keyboard 10, the resultant strings of alpha-numeric characters can be considered to be the input word stream 12 which is operated upon by the invention. The system of FIG. 1 further includes an execution unit 16 for executing instructions to process natural language text and to execute the instructions necessary to carry out the process of the invention. The system of FIG. 1 also includes an output display unit 18 for displaying an output word stream 20 of natural language text which results from the operation of the invention.

In accordance with the invention, each trite phrase for which a replacement is desired, is paired with its corresponding replacement phrase. In the example shown in FIG. 2, the input word stream 12 includes the sentence "We are not about to climb that mountain." which contains the trite phrase "are not about to" which can be replaced by the sentence beginning "We do not intend to climb that mountain." which contains the replacement phrase "do not intend to." In accordance with the invention, a family of trite phrases and its corresponding family of replacement phrases are represented by a phrase-pair expression 28 which symbolizes the phrases in all of their parts of speech (number, gender, tense, etc.). Each phrase-pair expression 28 includes a source phrase segment representing the family of trite phrases, which contains a variable source word element 30 and a constant source word element 32, as is shown in FIG. 1. Each phrase-pair expression also includes a replacement phrase segment containing a variable replacement word element 34 and a constant replacement word element 36, as shown in FIG. 1. A plurality of these phrase-pair expressions 28, 28', 28", etc. are stored at addressable locations in the memory 14, as is represented by step 60 of the flow diagram of FIG. 3. Each phrase-pair expression 28 represents a different family of paired, trite and replacement phrases.

The variable source word element 30 of FIG. 1 symbolically represents all of the parts of speech for a verb (for example) in the trite phrase. (The variable source word element 30 can also symbolically represent all of the parts of speech for pronouns, pronoun-verb combinations, verb phrases, regular verb endings, and other grammatical elements and combinations.) The variable source word element 30 serves as an address pointer to a first table called the source table 38 in FIG. 1, stored at an addressable location in the memory 14 and containing all of the forms of the symbolically represented verb. These verb forms are called values of the variable source word element 30. The plurality of source verb forms are arranged into a plurality of ranks 40, 42, 44, 46 and 47 in the source table 38 of FIG. 1. These ranks have a grammatically significant sequence, as can be seen in Table I and in FIG. 2. Table I analyzes the source phrase "are not about to" and its preceding pronoun "we" into its various parts of speech. The verb "are" in the source phrase is the first person, plural, present tense form of the verb "be." The forms of the verb "be" in Table I are "am," "are," "is," "was," and "were." The grammatical characteristics of each of these verb forms is displayed in Table I. The verbs shown in Table I are the various source verb forms of the variable source word element 30. The verbs are arranged into the first, second, third, fourth and fifth ranks shown in Table I which correspond to the source table 38 ranks 40, 42, 44, 46 and 47, respectively, as shown in FIG. 2. A plurality of source tables 38, 38' and 38" is stored at addressable locations in the memory 14, each table 25 corresponding to a different family of verb forms, pronoun forms, and other parts of speech, as is represented by step 62 of the flow diagram of FIG. 3.

TABLE I

Source phrase = "We are not about to"
Source constant = "not about to"
Source variable = the various forms of the verb "be"

| Pronoun | Verb | Verb Form of "be" | Rank |
|---|---|---|---|
| I | am | first person, singular, present tense | 1st |
| We | are | first person, plural, present tense | 2nd |
| You | are | second person, singular, present tense | 2nd |
| They | are | third person, plural, present tense | 2nd |
| He | is | third person, singular, present tense | 3rd |
| She | is | third person, singular, present tense | 3rd |
| It | is | third person, singular, present tense | 3rd |
| I | was | first person, singular, past tense | 4th |
| He | was | third person, singular, past tense | 4th |
| She | was | third person, singular, past tense | 4th |
| It | was | third person, singular, past tense | 4th |
| You | were | second person, singular, past tense | 5th |
| We | were | first person, plural, past tense | 5th |
| They | were | third person, plural, past tense | 5th |

The variable replacement word element 34 of FIG. 1 symbolically represents all of the parts of speech for a corresponding replacement verb (continuing with the same example) in the replacement phrase. (The variable replacement word element 34 can also symbolically represent all of the parts of speech for pronouns, pronoun-verb combinations, verb phrases, regular verb endings, and other grammatical elements and combinations.) The variable replacement word element 34 serves as an address pointer to a second table called the replacement table 48 shown in FIG. 1, which is stored at an addressable location in the memory 14 and which contains all of the forms of the symbolically represented replacement verb. These verb forms are called values of the variable replacement word element 34. The plurality of replacement verb forms are arranged into a plurality of ranks 40', 42', 44', 46' and 47' shown in FIG. 1. These ranks have a grammatically significant sequence with the verb form in each rank of the replacement table 48 being grammatically equivalent to the verb form in a corresponding rank of the source table 38. This is illustrated in Table II and in FIG. 2. Table II shows the replacement phrase "do not intend to" and its preceding pronoun "we" analyzed into its various grammatical forms. The verb forms for the verb "do" include the verbs "do," "does," and "did." The various parts of speech for these verb forms are shown in Table II. These various parts of speech are ranked in the same order as the corresponding rankings for the parts of speech shown for the source phrase in Table I. The first, second, third, fourth and fifth ranks shown in Table II occupy ranks 40', 42', 44', 46' and 47', respectively, of the replacement table 48 shown in FIG. 2. A plurality of replacement tables 48, 48', 48'', etc. is stored at addressable locations in the memory 14, each table corresponding to a different family of verb forms, pronoun forms and other parts of speech, as is represented by step 64 in the flow diagram of FIG. 3.

TABLE II

Replacement phrase = "We do not intend to"
Replacement constant = "not intend to"
Replacement variable = the various forms of the verb "do"

| Pronoun | Verb | Verb Form of "do" | Rank |
|---|---|---|---|
| I | do | first person, singular, present tense | 1st |
| We | do | first person, plural, present tense | 2nd |
| You | do | second person, singular, present tense | 2nd |
| They | do | third person, plural, present tense | 2nd |
| He | does | third person, singular, present tense | 3rd |
| She | does | third person, singular, present tense | 3rd |
| It | does | third person, singular, present tense | 3rd |
| I | did | first person, singular, past tense | 4th |
| He | did | third person, singular, past tense | 4th |
| She | did | third person, singular, past tense | 4th |
| It | did | third person, singular, past tense | 4th |
| You | did | second person, singular, past tense | 5th |
| We | did | first person, plural, past tense | 5th |
| They | did | third person, plural, past tense | 5th |

In response to a command entered by the writer at the keyboard 10, the execution unit 16 of the computer will compare first target words 24 in an alpha-numeric string from the input word stream 12 with the constant source word elements 32 in each of the plurality of phrase-pair expressions 28, 28' and 28'', as is represented by step 66 of the flow diagram of FIG. 3. The constant source word element 32 in the phrase-pair expression 28 is the constant portion of the trite phrase which does not change when the phrase is used in various parts of speech. This constant portion can be a single word or a sequence of words in an alpha-numeric string which is compared with the alpha-numeric strings in the input word stream 12. Each phrase-pair expression 28, 28', 28'', etc. in the memory 14 is accessed for the comparison and eventually a match is found between the constant portion of a trite phrase in one of the phrase-pair expressions 28 and the target word or sequence of words 24 in the input word stream 12. This is represented in step 68 of FIG. 3. As is shown in the example of FIG. 2, the first target string 24 is the phrase "not about to" which is matched with the source constant 32 in the phrase-pair expression 28.

The variable source word element 30 in FIG. 1 in the trite phrase portion of the matched phrase-pair expression 28, is then used as an address pointer to the source table 38 which contains all of the forms of the symbolically represented verb in the trite phrase. This source table 38 is accessed as is represented by step 70 of the flow diagram of FIG. 3. Each of the verb forms in the source table 38 is then compared with a second target word or sequence of words in a string 26 in the input word stream 12, which is proximate to the first target words 24 found to match the constant portion of the trite phrase. This is represented by step 72 in the flow diagram of FIG. 3. If a match is found with one of the verb forms in the source table 38, then an actual trite phrase 22 has been located in the input word stream 12. In the example shown in FIG. 2, the second target string 26 is the word "are" which matches with the verb form "are" in the second rank 42 of the source table 38. The matched phrase 22 will be highlighted on the display screen 18 of the computer as a trite phrase which is a candidate for replacement.

The invention then proceeds in step 74 of the flow diagram of FIG. 3, to generate the grammatically equivalent replacement phrase by identifying the grammatically significant rank of the trite verb form in the source table 38 which is equal to the matched, second target word 26. This is the second rank 42.

Then, the replacement table 48 is accessed, as is represented by step 76 in the flow diagram of FIG. 3. This is accomplished by using the variable replacement word element 34 in the replacement phrase portion of the matched phrase-pair expression 28 of FIG. 1, as an address pointer to the replacement table 48 which contains all of the forms of the symbolically represented verb in the replacement phrase. The replacement table 48 is accessed and the replacement verb form "do" in the second rank 42' of the table 48 is the replacement verb form which corresponds to the grammatically significant second rank 42 which was previously identified in the source table 38. Step 78 of the flow diagram of FIG. 3 represents the selection of the replacement verb for the replacement phrase.

FIG. 1 shows that an output replacement phrase 50 consisting of a replacement value 52 and a replacement constant 54, is constructed from the replacement verb selected from the rank 42' of the replacement table 48 and the constant replacement word element 36 in the matched phrase-pair expression 28. The constant replacement word element 36 in the phrase-pair expression 28 is the constant portion of the replacement phrase which does not change when the phrase is used in its various parts of speech. This constant portion can be a single word or a sequence of words in an alpha-numeric string, to which is added the replacement verb from the replacement table 48, to form the output replacement phrase 50, as represented by step 80 of the flow diagram of FIG. 3.

The output replacement phrase 50 is then displayed on the display screen 18 to the writer. The writer can then decide whether he wants to substitute the replacement phrase 50 for the highlighted trite phrase 22. If he desires to make the substitution, the writer enters the command at the keyboard 10 and the alpha-numeric string comprising the replacement phrase 50 is substituted for the first and the second target words or multiple word strings 24 and 26 in the input word stream 12.

Alternately, the substitution of the replacement phrases into the manuscript text can be done automatically without requiring the writer's further intervention. The output word stream 20 can then be directly stored as a modified manuscript text in the memory 14 or disk storage 17.

In this manner, replacement phrases which are grammatically equivalent to the trite phrases to be replaced, can be immediately inserted into the text without further alteration. An additional advantage of the invention is the significant data compaction which is achieved for the trite phrases and the replacement phrases being stored in the memory 14. By representing the family of trite phrases and their corresponding replacement phrases with a phrase-pair expression 28, a source table 38 and the replacement table 48, a significant reduction in the memory space required for the storage of such phrases, is achieved.

The second embodiment of the invention shown in FIGS. 4-9 builds upon the principle of operation of the first embodiment which has been described in conjunction with FIGS. 1-3. Improvements in the second embodiment of the invention include the use of match terms to identify the source phrase in the input word stream and the use of hash encoding of a focus word or words in the source constant of the phrase-pair expression to increase the speed of comparison with the input word stream. The second embodiment of the invention is described as follows.

DESCRIPTION OF THE SECOND EMBODIMENT OF THE INVENTION

The second embodiment of the system for compaction and replacement of phrases is shown in FIGS. 4-9.

The system provides for the automatic replacement of words and phrases in specific linguistic context such as automatic translation, the replacement of improper grammatical phrases, and term substitution with definitions. Linguistic compaction is achieved by the invention through the use of symbolic expressions and grammatical completeness is achieved through the use of relational tables.

DESCRIPTION OF COMPACTION AND DECODING PROCESS

Compaction and decoding of phrases consists of three stages:
1. linguistic codification
2. phrase compaction
3. phrase decoding 1. Procedure for Linguistic Codification of the Phrases The linguistic codification of the phrases is best done manually to create files that can be understood and maintained easily. The linguistic codification requires recognizing the elements of the language with which correspondences need to be established and defining the tables used to generate conjugations and other linguistic variants.

One begins with a compendium of cliches and trite phrases. Many of the phrase are associated with a preferred usage. For example, "have the ability to" can be more concisely stated as "can" or "be able to." The phrase file is the compilation of phrase-pair expressions 28, encoded to allow variants of a word by reference to list names. The "at" symbol (@) is used as a list name symbol at the beginning of those words in the phrase file which have reference lists of variants or alternate parts of speech for the word in source tables 38 or in replacement tables 48. A typical phrase file entry is:

@have the ability to=@can, @be able to

This entry is a phrase-pair expression 28 which references the lists of words with the names "@have," "@can,"and " @be"each consisting of four entries:

| @have  | @can  | @be         |
|--------|-------|-------------|
| have   | can   | am, are, be |
| has    | can   | is          |
| had    | could | was, were   |
| having | ##    | being       |

The @have list is a source table 38 and the @can and @be lists are replacement tables 48. The first line of each list contains the infinitive/present form of the verb, the second line the third person form, the third line has the past tense forms, and the fourth line the present participle form. A null entry is indicated by a double pound sign. The mapping of the phrase to its replacement is accomplished on the basis of the correspondences of these lists.

Phrase-pair expression 28 entries of the phrase file consist of two parts the source <PHRASE> and the <REPLACEMENT> phrase separated by an equal sign. The following Backus-Naur Form (BNF) description defines the format of the entries. Quoted strings represent literals; lower case names represent terminal symbols. (See Naur, P., "Revised Report on the Algorithmic Language ALGOL 60," *Communications of the ACM*, 6 (*January* 1963), 1-17)).

```
The format of an ENTRY is <PHRASE> "="
  <REPLACEMENT>,
where <PHRASE>    is <WORD> | <PHRASE>
                    " " <WORD> or <STRLIST> |
                    <PHRASE> " " <STRLIST>'
      <REPLACEMENT> is <WORD> |
      <REPLACEMENT> " " <WORD>,
      <WORD> is  @list
                 or string
                 or string+@list
                 or string(ending) and
      <STRLIST> is string or strlist.
      The symbol "=" is the "equal sign" character. The symbol
"|" means "or." The symbol "  " is a blank character.
```

As an example the source phrase "@have low | high value(s)" will match against the following alpha-numeric strings in the input word stream:

| have low value  | has low value  | had low value  | having low value  |
| have low values | has low values | had low values | having low values |
| have high value | has high value | had high value | having high value |
| have high values| has high values| had high values| having high values|

Similarly, the use of ending lists allows a very compact form in the phrase file to match a large number of input words. The list "@elr," for example, contains the endings for regular verbs and allows "work+@elr" to match against "work," "works," "worked," and "working."

2. Phrase Compaction Process

Figure 4:
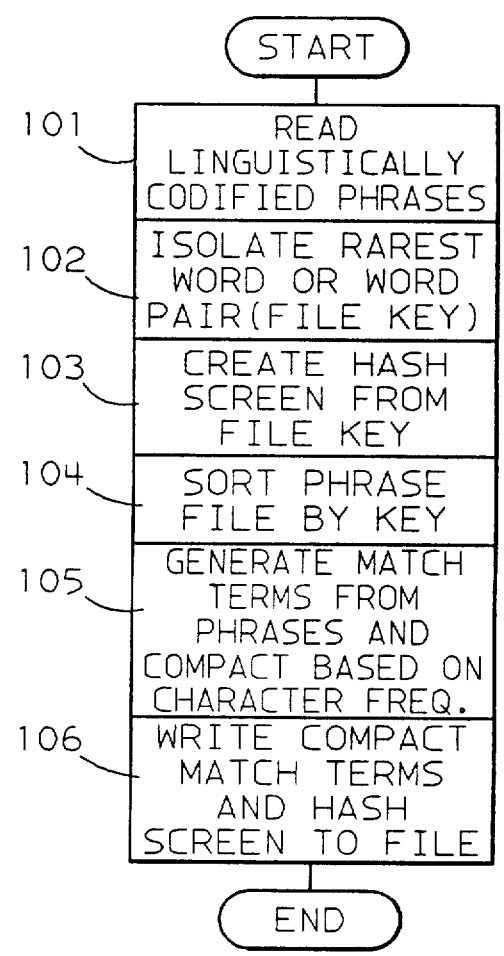
FIG. 4 is a flow diagram of a second embodiment of the invention, illustrating the phrase compaction process.

The phrase compaction is illustrated in FIG. 4. In step 101 the linguistically codified phrase-pair expressions 28 are read by the program. The word in the constant source word element 32 which is to be used as an index key (the focus word) is identified and isolated in step 102. In step 103, the invariant attributes of the key are used to construct a series of bit patterns that are highly characteristic of the key. The bit patterns for all the keys of the file are superimposed in a hash screen table. Although the superimposed bit patterns are not unique for any particular key, the presence of all the bits for a particular term indicates that the term has a high probability of being a key in the phrase table. (Examples of suitable hashing techniques are given in Bloom, B. H. "Space/Time Trade-Offs in Hash Coding with Allowable Errors," *Communications of the ACM*, 13(7), 1977, pages 422-426 and also in Murray, D. M., "A Scatter Storage Scheme for Dictionary Lookups," *Journal of Library Automation*, Vol. 3/3, September 1970, pp. 173-201.)

The index key is also used in step 104 to sort the phrase-pair expressions in the phrase file, to organize it for efficient retrieval. In step 105 the source phrase portion of phrase-pair expressions 28 are decomposed into terms used for matching during the decoding stage. The match terms have to include a description of positional constraints (such as adjacency of words) and an indication of special matching requirements (references to ending lists, alternate terms, etc.). Step 105 also encompasses the encoding of the match terms based on the frequencies of the characters in the text. Frequency-based compaction reduces storage requirements significantly, although not as much as linguistic codification.

Finally, in step 106, the encoded phrase file and the hash screen is written to an output file which is used during the decoding stage.

3. Process for Decoding Phrase Tables

Figure 5:
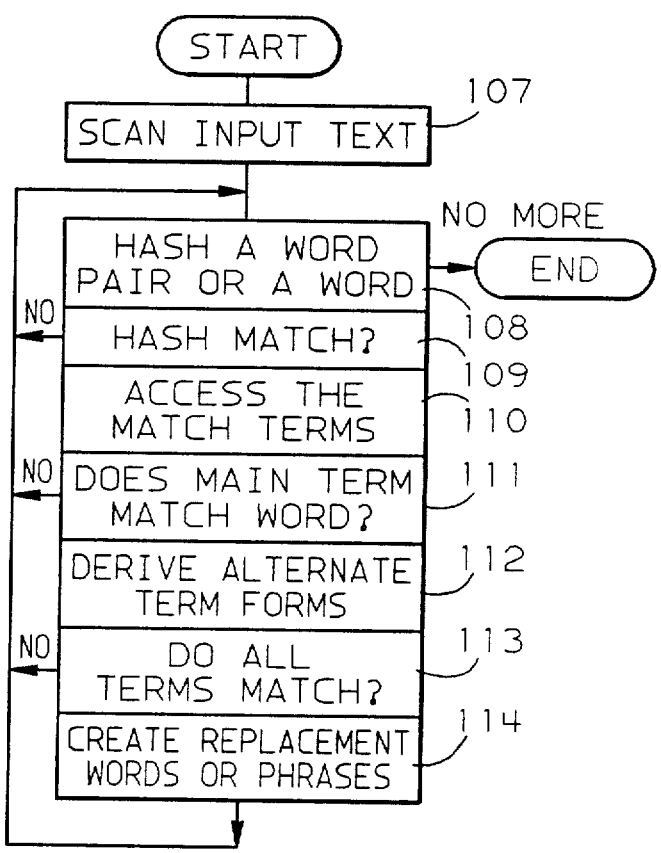
FIG. 5 is a flow chart of the second embodiment of the invention, illustrating the process for decoding the phrase tables.

FIG. 5 illustrates the steps required for decoding the phrase-pair expressions 28 in the phrase file. The purpose of the process is to identify target phrases within the input word stream that match against the source phrase portion of phrase-pair expressions 28 and provide replacement alpha-numeric strings which can be synonyms, foreign language translations, or grammatically equivalent replacement phrases which can include annotations.

Step 107 is the initial step of scanning the input word stream and identifying words and punctuation. Each word pair and word of the input word stream is hashed in step 108 using the same procedure that was used during the creation of the compact phrase tables. In step 109 the hash codes for the word pairs or word from the input word stream are tested against the hash screen table. If all the bits of the hash code are found to be "on" in the hash screen table, the word pair or word from the input word stream is presumed to be in the phrase file and processing continues, otherwise processing continues with words from the input word stream looking for a match.

Once the hash screen has been successfully matched, step 110 accesses the compacted phrase file and reads the records containing the key term. A character-by-character comparison is used in step 111 to determine whether the key term in the phrase file actually matches the word from the input word stream. The word may not match because of a false "collision" in the hash screen table; in this case the process goes back to step 108 and tries another word from the input word stream.

After the key term has matched, the variable source word 30 associated with the key term is matched. This requires referencing the source table 38 containing the term lists in step 112 and matching source word element values by suffix substitution. The final matching procedure in step 113 consists of applying rules for matching adjacent words of the phrase. If any matching requirement fails, processing resumes at step 108.

Finally, when all terms have matched properly, the replacement phrase associated with the matching phrase is uncompacted. Processing resumes from step 108 until all the input word stream has been processed.

Figure 6:
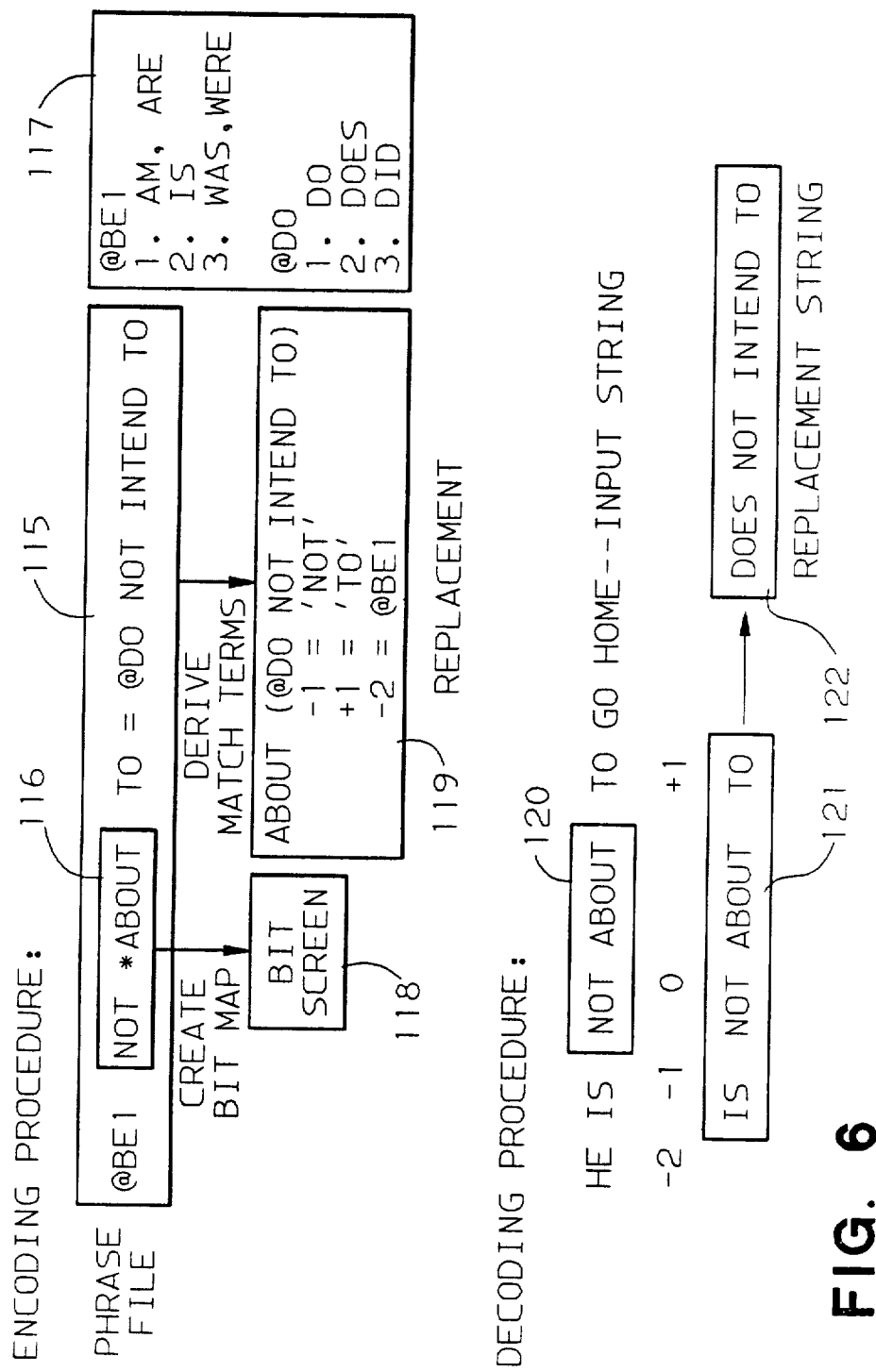
FIG. 6 is a conceptual diagram of the second embodiment of the invention, showing the overall process.

FIG. 6 illustrates the process for converting the linguistically encoded phrase file into the bit screen table and match terms that make it possible to match efficiently against input text. Box 115 identifies a linguistically encoded phrase where the symbolic variable @BE1 represents forms of the verb "be" and the variable @DO represents forms of the verb "do." The phrase is encoded as an equation where the left side specifies the matching constraints and the right side specifies the corresponding replacement. Box 116 identifies the word pair "not about" as the index key. The word "about" is preceded by an asterisk to indicate that it is the word indexed. Box 117 contains the entries defining the symbolic variables. The entries of each symbolic variable have a one-to-one correspondence based on grammatical constraints (person, in this case). Box 119 contains the match terms derived from the left side of the phrase in box 115. Box 119 contains the relative word numbers and values required to effect a successful match; the replacement used after a successful match is given within parentheses next to the index word.

The decoding process starts by isolating the words of the input word stream, hashing them, and testing the hash codes against the bit screen. When the match against the bit screen is successful, the rules for the index word are retrieved and applied against the input sentence. Box 120 in FIG. 6 identifies a word pair which has been successfully matched against the bit screen in box 118. Since the word "about" is the current word, the words around it are given relative numbers as indicated under box 120. The match terms in box 119 are applied to determine if the phrase matches. These terms are ordered so that the ones that require the least amount of effort for matching are checked first. First, the process checks to the left of the word "about" for the word "not" which is in the "−1" position (i.e., one word to the left of "about"). The next check is for the word "to" to the right of "about," and the last check is for the symbolic variable "@BE1" two words to the left of "about." Checking symbolic variables involves consulting their definition (box 117) and keeping track of the relative position of the match. In this case the word "is" matches the second line of the definition for @BE1.

Having matched successfully, the process generates the replacement phrase from the parenthetical expression in box 119. Since this expression has a symbolic variable, the process retrieves a term corresponding to the same relative position as the term that matched. The second word of the "@DO" variable is "does" and the replacement phrase is "does not intend to" which is given in box 122.

Figure 7:
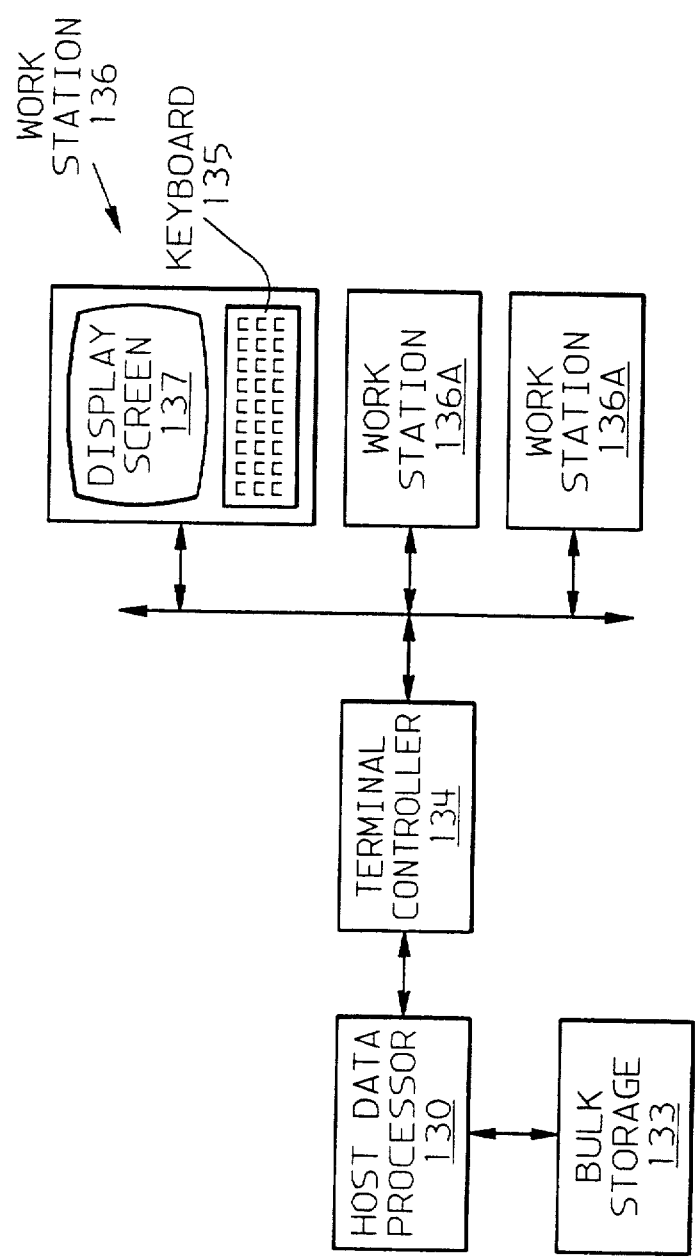
FIG. 7 is a functional block diagram of the second embodiment of the invention, illustrating the host data processing system.
Figure 8:
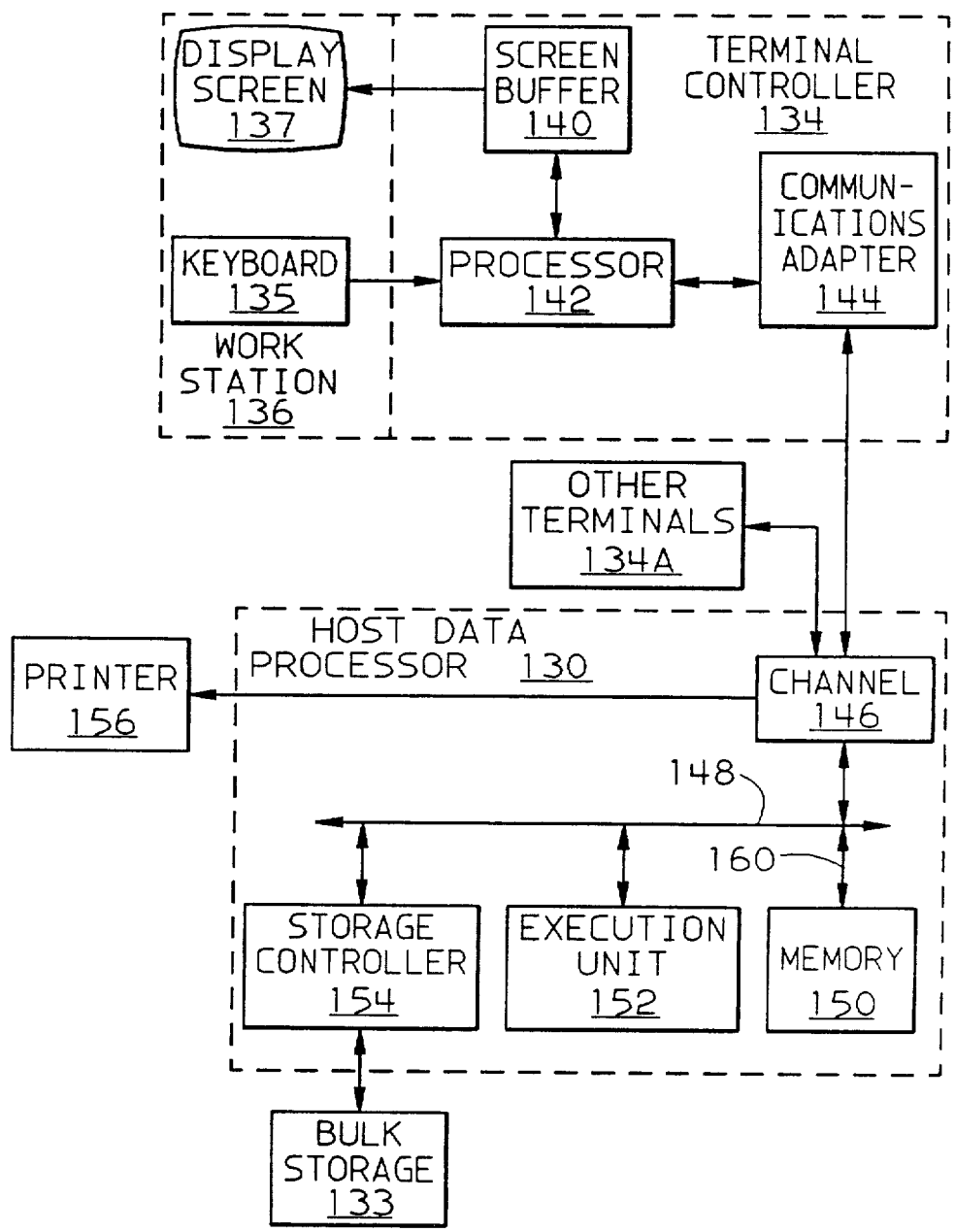
FIG. 8 is a system block diagram of the data processing system shown in FIG. 7.
Figure 9B:
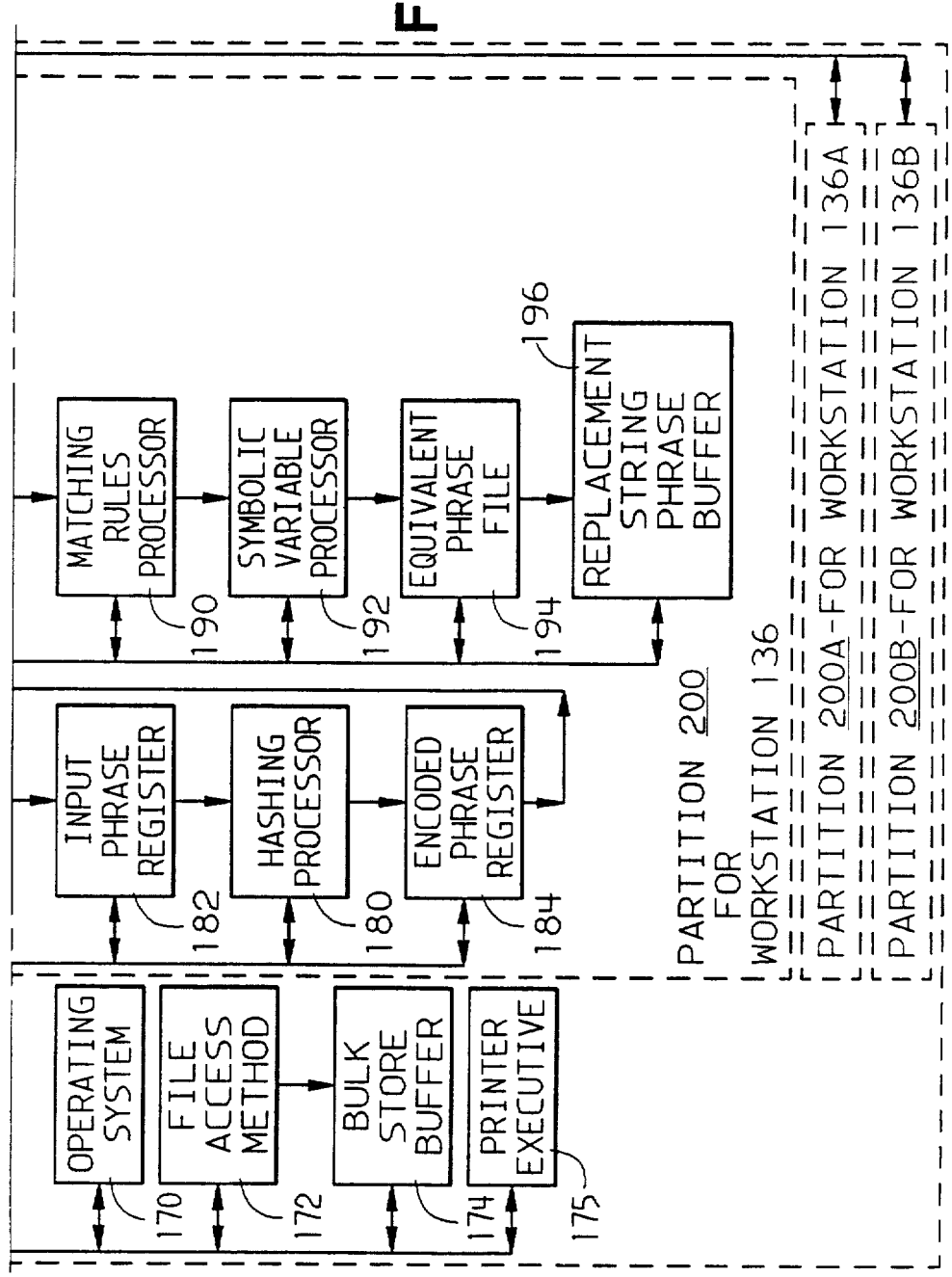
FIG. 9 is a logical block diagram showing the apparatus of the memory 150 in FIG. 8, including several designated data areas and functional programs controlling the operation of the system.

The system for compaction and replacement of phrases finds its preferred application in a host data processing system such as that shown in FIGS. 7, 8 and 9. FIG. 7 is a system diagram of the host data processing system. The host data processor 130 is connected through a terminal controller 134 to a plurality of workstations 136, 136A and 136B. The host data processor 130 is also connected to a bulk storage unit 133. The system configuration of FIG. 7 can be embodied with an IBM System/370-type host data processor 130, such as an IBM 3081 processor connected through an IBM 3274 terminal controller 134 to an IBM 3270 workstation 136. Details of such a configuration can be found, for example, in U.S. Pat. No. 4,271,479 to Cheselka, et al., entitled "Display Terminal With Modularly Attachable Features," which is assigned to the IBM Corporation. A more detailed description of the host data processor 130 can be found in *IBM System/370 Principles of Operations*, Order No. GA22-7000, published by the IBM Corporation, 1981. The host data processor 130 can employ an operating system such as the Virtual Machine/Conversational Monitor System (VM/CMS) which is described in *IBM Virtual Machine Facility/370 Introduction*, IBM Systems Library, Order No. GC20-1800, published by the IBM Corporation, 1981.

The system shown in FIG. 7 is described in greater detail in FIG. 8 where it is seen that the host data processor 130 has a primary bus 148 which interconnects the channel 146, the memory 150, the execution unit 152 and the storage controller 154. The bulk storage 133, which can be a large capacity disk drive such as an IBM 3380, is connected to the storage controller 154. The channel 146 is connected to a plurality of input/output terminals 134A. The channel 146 is also connected to the terminal controller 134. The terminal controller 134 includes a screen buffer 140 which is connected to the display screen 137, a processor 142 which is connected to the screen buffer 140 and also to the keyboard 135, and the communications adapter 144 which is connected to the processor 142. The communications adapter 144 provides the communications interface with the channel 146 of the host data processor 130. The workstation 136, which includes the display screen 137 and the keyboard 135, is also shown in FIG. 8, as it is related to the terminal controller 134. In addition, the channel 146 includes an output to the printer 156.

A user at the workstation 136 will access the system by inputting commands and working text at the keyboard 135. This information is processed by the processor 142 which writes into the local screen buffer 140 for immediate display on the display screen 137. Whenever a command key or a function key is depressed on the keyboard 135, the processor 142 alerts the communications adapter 144 to transfer those portions of the working text which have been changed in the screen buffer 140, to the channel 146 of the host data processor 130. The information received by the channel 146 is transferred to the bus 148. Conversely, when information is provided by the bulk storage 133 through the information controller 154 to the bus 148, or by the execution unit 152 to the bus 148, or by the memory 150 to the bus 148, that information is transferred by the channel 146 to the communications adapter 144 at the terminal controller 134 for display on the display screen 137.

The random access memory 150 in the host data processor 130 includes a number of data areas and functional programs for operating with the data input into it through the bus 160 which is connected to the bus 148. FIG. 9 is a logical block diagram showing the apparatus of the memory 150 including several designated data areas and functional programs controlling the operation of the system. The instructions in each of the functional programs are executed by the execution unit 152. The memory 150 is divided into a plurality of substantially identical partitions 200, 200A and 200B which respectively perform the functions for workstations 136, 136A and 136B of FIG. 7. The VM/CMS operating system program 70 in the memory 150 provides the overall control for the operation of the host data processor 130 and provides the coordination of the memory partitions 200, 200A and 200B so that the users of the respective workstations 136, 136A and 136B appear to have seemingly separate and independent IBM System/370 computing systems. See the above cited VM/CMS reference for further details. The file access method 172 coordinates transfers of data between the bulk store buffer 174 in the memory 150 and the storage controller 154 which interfaces with the bulk storage 133. The printer executive 175 controls printer 156 operations through the channel 146.

FIG. 9 shows the apparatus of memory 150 during the decoding process when phrases within an input string are matched against the phrase file and replacement strings are provided which can be synonyms, foreign language translations, or replacement phrases which can also include annotations. During a text processing session, the operator at the workstation 116 inputs words and phrases at keyboard 135 and the terminal controller 134 transfers that text to the host data processor 130 where it is stored in the memory 150 in the working text buffer 178 where it can be operated upon by the word processing executive 176 to carry out conventional word processing operations. When the operator indicates by a control input at the keyboard 135 that phrase substitution is desired, input phrase strings are transferred from the working text buffer 178 to the input phrase register 182. The hashing processor 180 operates on the phrases in the input phrase register 182 and provides hash-encoded values for the input phrase to the hash-encoded input phrase register 184. The hash-encoded values for the input in 184 are then compared with the hash bit screen table (for the source file) in the buffer 188 by means of the comparator 186, in order to identify index or focus words. When a successful comparison is achieved by the comparator 186, the rules processor 190 performs a matching operation checking to determine if the adjacent words in the phrase in the input phrase register 182 satisfy the replacement rules. If the rules processor satisfies the matching of terms between the input phrase and the source file phrase, then the symbolic variable processor 192 selects the correct part of speech for the symbolic variables which occur in the replacement phrase. The replacement string is then output from the file buffer 194 which contains the equivalent phrases, and is stored in the replacement string phrase buffer 196, for transmission over bus 160 and through the channel 146 to the terminal controller 134, for display on the display screen 137 at the workstation 136. The operator can then elect whether to adopt the suggested replacement phrase being displayed on the display screen 137. The operator can make this election by entry to the keyboard 135, indicating the desired substitution of the replacement string for the existing input phrase.

Although the disclosed embodiment in FIGS. 7, 8 and 9 is in a host data processing system, the invention can also find application in smaller data processing systems, such as the IBM Personal Computer, Model 5160, for example.

The resulting system for compaction and replacement of phrases provides an improved system for phrase replacement which is based upon the linguistic relationship between the input phrase and the replacement phrase. The information is compacted using a combination of character frequency encoding and a recognition of the linguistic regularities in natural languages.

Although a specific embodiment of the invention has been disclosed it will be understood by those of skill in the art that the foregoing and other changes in form and detail may be made therein without departing from the spirit and the scope of the invention.

What is claimed is:

1. In an information processing system including an input unit connected to an input word stream of natural language text, a storage unit for storing natural language text, an execution unit for executing instructions to process natural language text and an output unit for displaying an output word stream of natural language text, a process for the replacement of natural language test, a process for the replacement of natural language source phrases contained in said input word stream with natural language replacement phrases which are inserted into said output word stream, comprising the steps of:

storing a plurality of phrase-pair expressions in said storage unit, each said expression including a source phrase segment containing a variable source word element and a constant source word element and each said expression including a replacement phrase segment containing a variable replacement word element and a constant replacement word element;

storing a source table is said storage unit, having a plurality of source word element values arranged into a plurality of ranks having a grammatically significant sequence, said varaible source word element in said plurality of phrase-pair expressions serving as a pointer for accessing said source table;

storing a replacement table in said storage unit, having a plurality of replacement word element values arranged into a plurality of ranks having a grammatically significant sequence with values in each rank of said replacement table being grammatically equivalent to said values in a corresponding rank of said source table, said variable replacement word element in said phrase-pair expressions serving as a pointer for accessing said replacement table;

comparing in said execution unit, first input words from said input word stream with said constant source word elements in said plurality of phrase-pair expressions and accessing a first one of said phrase-pair expressions having a constant source word element equal to said first input words;

identifying a second input word adjacent to said first input words thus compared;

accessing said source table which is pointed to by said variable source word element in said first one of said phrase-pair expressions, comparing each of said source word element values in said source table with said second input word from said input word stream and identifying the grammatically significant rank of the source word element value in said source table which is equal to said second input word;

accessing said replacement table which is pointed to by said variable replacement word element in said first one of said phrase-pair expressions, and accessing from said replacement table the grammatically equivalent replacement word element value in the rank of said replacement table which corresponds to said grammatically significant rank identified in said source table;

outputting an output replacement phrase to said output unit, which includes said grammatically equivalent replacement word element value and said constant replacement word element from said first one of said phrase-pair expressions.

2. In an information processing system including a means for providing an input word stream of natural language text, a storage means for storing natural language text, an execution means for executing instructions to process natural language text and a utilization means for receiving an output word stream of natural language text, a process for the replacement of natural language source phrases contained in said input word stream with natural language replacement phrases which are inserted into said output word stream, comprising the steps of:

storing a plurality of phrase-pair expressions in said storage means, each said expression including a source phrase segment containing a variable source word element and a constant source word element and each said expression including a replacement phrase segment containing a variable replacement word element and a constant replacement word element;

storing a source table in said storage means, having a plurality of source word element values arranged into a plurality of ranks having a grammatically significant sequence, said variable source word element in said plurality of phrase-pair expressions serving as a pointer for accessing said source table;

storing a replacement table in said storage means, having a plurality of replacement word element values arranged into a plurality of ranks having a grammatically significant sequence with values in each rank of said replacement table being grammatically equivalent to said values in a corresponding rank of said source table, said variable replacement word element in said phrase-pair expressions serving as a pointer for accessing said replacement table;

comparing first input words from said input word stream with said constant source word elements in said plurality of phrase-pair expressions and accessing a first one of said phrase-pair expressions having a constant source word element equal to said first input words;

identifiying a second input word adjacent to said first input words thus compared;

accessing said source table which is pointed to by said variable source word element in said first one of said phrase-pair expressions, comparing each of said source word element values in said source table with said second input word from said input word stream and identifying the grammatically significant rank of the source word element value in said source table which is equivalent to said second input word;

accessing said replacement table which is pointed to by said variable replacement word element in said first one of said phrase-pair expressions, and accessing from said replacement table the grammatically equivalent replacement word element value in the rank of said replacement table which corresponds to said grammatically significant rank identified in said source table;

outputting an output replacement phrase to said utilization means, which includes said grammatically equivalent replacement word element value and said constant replacement word element from said first one of said phrase-pair expressions.

3. The process of claim 2, wherein said step of storing a source table further comprises said plurality of source word element values being a plurality of parts of speech of a verb.

4. The process of claim 2, wherein said step of storing a source table further comprises said plurality of source word element values being a plurality of parts of speech of a pronoun.

5. The process of claim 2, wherein said constant source word element in said phrase-pair expression is hash-encoded, producing a first bit pattern which is stored in a hash screen table.

6. The process of claim 5, wherein said first input words from said input word stream are hash-encoded, producing a second bit pattern which is compared with said first bit pattern in said hash screen table representing said constant source word element.

7. The process of claim 2, wherein said constant source word element includes linguistic selection rules associated therewith for matching words adjacent to said first input words in said input word stream.

8. A process for the compaction and replacement of phrases with grammatically equivalent phrases conforming to conventional grammatical constraints of the original phrase, comprising:

building with a data processor reference lists of pairs of phrases to correspond with each other, for enabling the replacement of a phrase with a grammatically equivalent phrase;

scanning a text to be analyzed, to match a source phrase with a family of target phrases, employing a bit map for source phrases and for target phrases created by hashing a word pair consisting of the least frequently used word and a proximate next-less frequently used word;

continuing with said scanning until a match is obtained in said bit map, indicating that a suitable target phrase has been found;

displaying said target phrase.

9. A process for compiling a phrase table of phrases with grammatically equivalent phrases conforming to conventional grammatical constraints of the original phrase, comprising:

preparing a set of linguistically codified phrases which arranges the order of storage of the elements of the language with which grammatical relationships need to be established and which defines stored tables used to generate conjugations and linguistic variants;

isolating a rarest used word as a file key for each codified phrase;

creating a hash screen for each said file key;

arranging the order of storage phrases in a phrase file by said file key;

generating characteristic match terms from phrases and compacting said set of codified phrases based upon character frequency;

storing said match terms for said compacted phrases and hash screen for reference by linguistic decoder.

10. A process for decoding phrase tables for replacing phrases with grammatically equivalent phrases conforming to conventional grammatical constraints of the original phrase, comprising the steps of:

scanning an input text containing a plurality of phrases;

hashing with a data processor a word selected from said plurality of input phrases;

comparing said hashed word with a hash bit screen for a phrase file of phrases equivalent to said selected word;

matching adjacent words to said selected word based upon linguistic rules relating said input phrase with said phrase derived from said phrase file;

outputting a replacement phrase from said phrase file which satisfies said matching step.

* * * * *